March 13, 1934. G. EGLOFF 1,950,720
CHLORINATION OF GASEOUS HYDROCARBONS
Filed Feb. 5, 1930
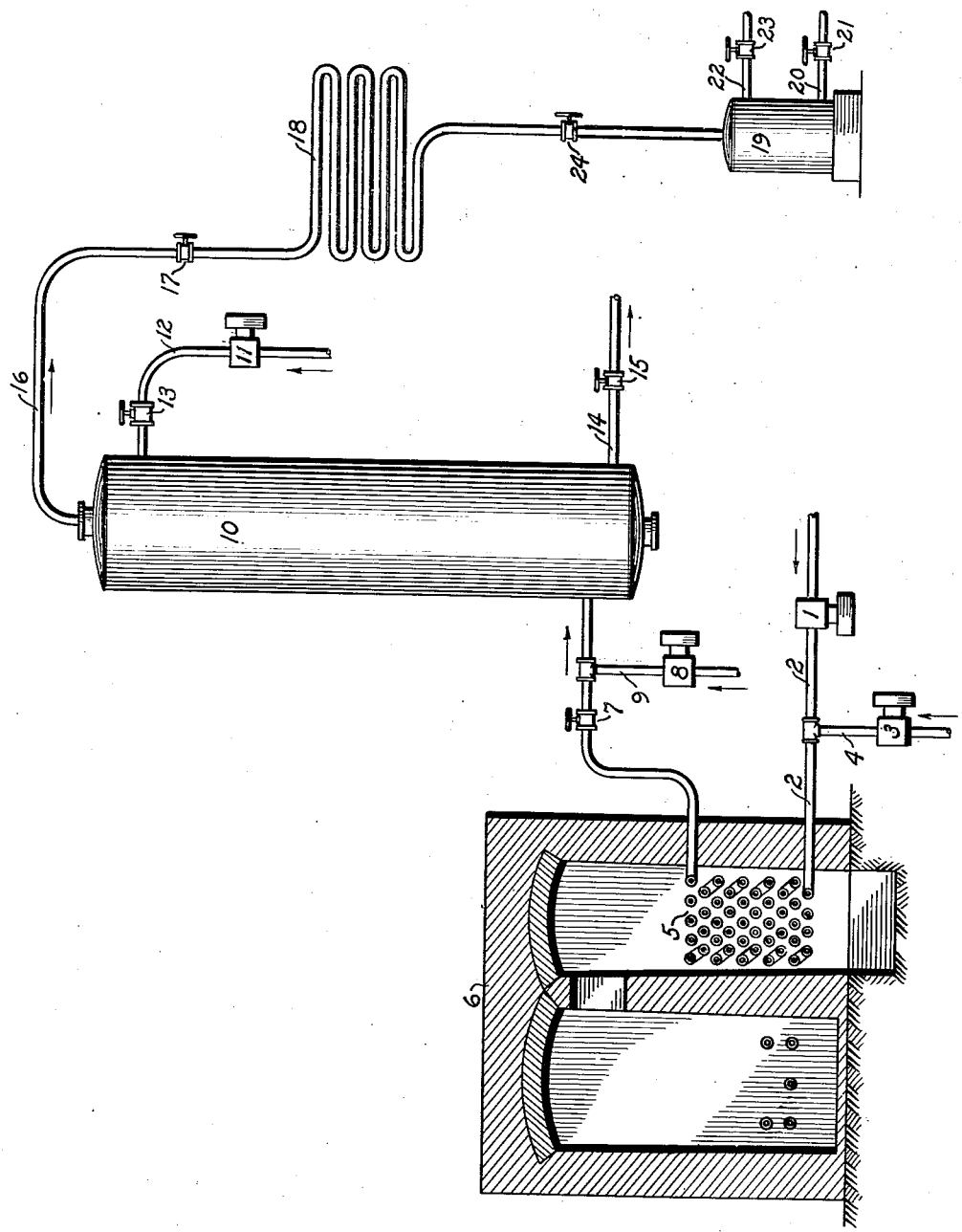
Witness:
Inventor:
Gustav Egloff,
By Frank L. Belknap
Atty.

Patented Mar. 13, 1934

1,950,720

UNITED STATES PATENT OFFICE 1,950,720

CHLORINATION OF GASEOUS HYDROCARBONS

Gustav Egloff, Chicago, Ill., assignor to Universal Oil Products Company, Chicago, Ill., a corporation of South Dakota Application February 5, 1930, Serial No. 426,050

1 Claim. (Cl. 260—166)

This invention relates to the treatment of gaseous hydrocarbons, and more particularly relates to chlorination of such hydrocarbons to produce chlorine derivatives therefrom.

In the treatment of hydrocarbon gases, such as natural gas, still gases, cracked gases and others, the addition of chlorine thereto causes such a violent reaction that the end products, such as carbon and hydrogen chloride, may be formed predominantly instead of desirable intermediate products such, for example, as monochlor, dichlor, trichlor and tetrachlor methane, and their homologues, such as the corresponding derivatives of ethane, propane, butane, etcetera, as well as the corresponding unsaturated hydrocarbons, such as ethylene, propylene and butylene. The production of any or all of these and like products is among the objects of this invention.

In carrying out the process of my invention, the hydrocarbon gases are heated, simultaneously introducing into the heating zone chlorine or a chlorine-containing gas, the temperature being such as to avoid excess reaction during the heat treatment, and the rate or velocity being such as to avoid excess time for the temperature treatment.

Among the features of my invention is the sudden cooling of the mixture of chlorine, gaseous hydrocarbons and products or derivatives obtained from the reaction between the chlorine and the gaseous hydrocarbons in order to stop the reaction before it has progressed too far, which would result in the destruction of the intermediate desirable derivatives.

In order to illustrate my invention further, I will refer to the single drawing showing diagrammatically a side elevation of apparatus suitable for carrying out the invention, said apparatus not being in any sense drawn to scale.

The natural gas or other hydrocarbon gas is fed by compressor 1 into line 2. The chlorine or chlorine-containing gas is fed by compressor 3 into line 4, from which it joins the stream of hydrocarbon gas in line 2. The mixture of hydrocarbon gases and chlorine or chlorine-containing gases is passed into the heating element 5 located in furnace setting 6, and the reaction continues throughout the heat treatment, being regulated both by the temperature and the time of treatment in the heating zone. The mixture of hydrocarbons and chlorine derivatives discharge from the heating element 5, controlled by throttle valve 7, which valve controls and regulates the pressure upon the heating element 5. As the mixture emerges from the heating zone, it is contacted or mixed with a suitable cooling medium, introduced by means of pump or compressor 8 into line 9, which may consist of some of the gas under treatment or other hydrocarbon gas or other gases, or a liquid cooling medium, the purpose of the cooling medium being to slow down the rate of reaction where the intermediate desirable chlorine derivatives are not destroyed by further reaction.

The products of the reaction together with excess gas are discharged into dephlegmating zone 10, where the mixture is subjected to a fractionating and separating action by a suitable arrangement, such as the use of bubble caps or packing.

In order to facilitate the separation of liquid products from gaseous products, and the separation of lighter from heavier liquid products, a suitable cooling medium is pumped by means of pump 11 through line 12, controlled by valve 13. The reflux condensate from the fractionating and separating zone is removed through line 14, controlled by valve 15. The vapors and gases leaving the dephlegmating and fractionating or separating zone 10 pass through line 16, controlled by valve 17, and into cooling and condensing element 18, the liquid products from which pass through valve 24 and are collected in receiver 19. These products are removed from the receiver through line 20, controlled by valve 21. The gaseous products of the process are removed through line 22, controlled by valve 23.

As an example of my process, the mixture of chlorine and hydrocarbon gases, for example, still gases containing approximately 20% of chlorine by volume, is passed through the heating coil at a temperature range of approximately 250° to 750° F., more or less, and the products are subsequently separated and collected as before described. Among the products separated from the mixture recovered in the receiver 19 are chlorine derivatives of the saturated homologues from methane to butane, and from ethylene to butylene, as well as the derivatives of higher boiling homologues.

My process is not limited to the specific conditions of temperature and pressure shown in the example, as the pressures may vary over a wide range, including atmospheric, sub-atmospheric and superatmospheric, and higher or lower temperatures than those indicated may be used, the temperature to be used being a function of the pressure and time of contact.

I claim as my invention:

In the preparation of chlorine derivatives, the method which comprises passing a mixture of normally gaseous hydrocarbons and chlorine through a heating zone, heating the hydrocarbons and chlorine in the heating zone sufficiently to react to form condensible chlor-hydrocarbons, abruptly cooling the mixture, immediately upon issuance from the heating zone, to below reaction temperature by injection of a cooling medium without effecting any substantial condensation of the condensibles, then further cooling the mixture to condense and separate the condensible chlor-derivatives from the permanent gases, and recovering the resultant condensate as the product of the process.

GUSTAV EGLOFF.